US012732575B2

(12) United States Patent
Lee et al.

(10) Patent No.: US 12,732,575 B2
(45) Date of Patent: Sep. 8, 2026

(54) METHOD AND SERVER FOR PROVIDING NOTIFICATION MESSAGE TO USER TERMINAL

(71) Applicant: KAKAO CORP., Jeju-si (KR)

(72) Inventors: Seok Gyu Lee, Seongnam-si (KR); Han Wool Cha, Seongnam-si (KR); Na Young Kim, Seongnam-si (KR)

(73) Assignee: Kakao Corp., Jeju-si (KR)

(*) Notice: Subject to any disclaimer, the term of this patent is extended or adjusted under 35 U.S.C. 154(b) by 350 days.

(21) Appl. No.: 18/522,796

(22) Filed: Nov. 29, 2023

(65) Prior Publication Data

US 2024/0195906 A1 Jun. 13, 2024

(30) Foreign Application Priority Data

Dec. 9, 2022 (KR) ........................ 10-2022-0171603

(51) Int. Cl.
*H04M 1/72451* (2021.01)
*H04L 51/52* (2022.01)
*H04L 67/306* (2022.01)

(52) U.S. Cl.
CPC ........ *H04M 1/72451* (2021.01); *H04L 51/52* (2022.05); *H04L 67/306* (2013.01)

(58) Field of Classification Search
CPC ................................................ H04M 1/72451
See application file for complete search history.

(56) References Cited

U.S. PATENT DOCUMENTS

| | | | | |
|---|---|---|---|---|
| 7,580,864 | B2 * | 8/2009 | Ahn | G06Q 30/0601 705/26.1 |
| 9,419,931 | B2 * | 8/2016 | Khandewale | H04L 67/55 |
| 9,807,038 | B2 * | 10/2017 | Van | G06Q 10/10 |
| 2016/0301639 | A1 * | 10/2016 | Liu | H04L 51/52 |
| 2018/0032585 | A1 * | 2/2018 | Kadiyala | G06N 20/00 |
| 2020/0005363 | A1 * | 1/2020 | Terry | G06Q 30/0279 |

FOREIGN PATENT DOCUMENTS

| | | | | |
|---|---|---|---|---|
| CN | 101730010 | A * | 6/2010 | H04W 4/00 |
| CN | 105681523 | A * | 6/2016 | H04M 1/72403 |
| JP | 2018-531476 | A | 10/2018 | |
| KR | 10-2005-0122609 | A | 12/2005 | |
| KR | 10-2008863 | B1 | 10/2019 | |
| KR | 10-2043482 | B1 | 11/2019 | |
| KR | 10-2020-0060241 | A | 5/2020 | |

* cited by examiner

*Primary Examiner* — William G Trost, IV
(74) *Attorney, Agent, or Firm* — Knobbe, Martens, Olson & Bear, LLP

(57) ABSTRACT

Proposed is a method in which a server provides a notification message to a user terminal. The method may include determining whether characteristic point-in-time information dependent on a friend account of a user account meets a first condition based on the reference point-in-time information and whether the friend account meets a second condition with respect to the user account. The method may also include identifying the friend account as a friend to be notified based on whether the first condition and the second condition are met. The method may further include providing a message including information about the friend to be notified to the user terminal.

18 Claims, 9 Drawing Sheets

FIG. 1

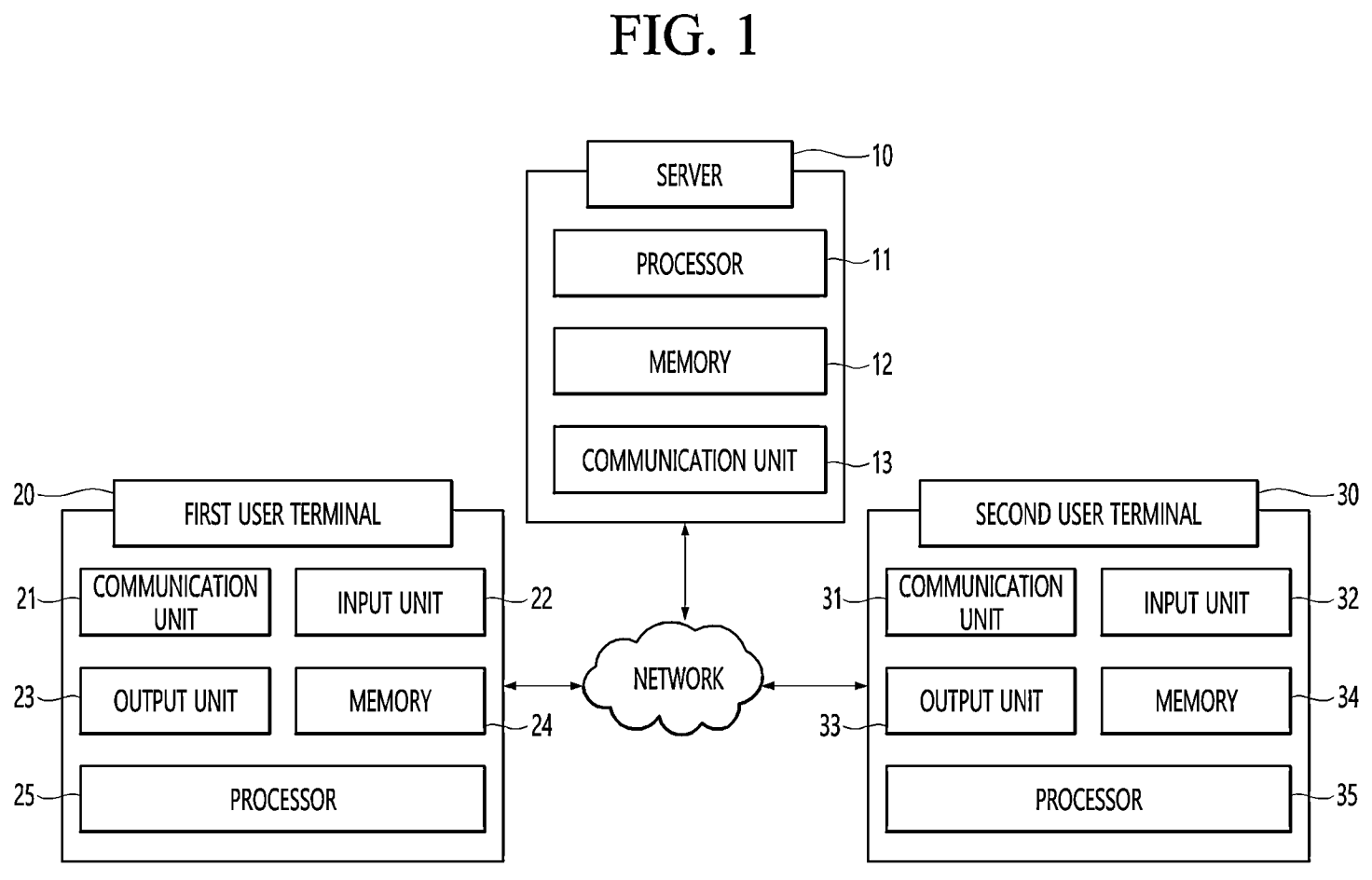

SERVER 10
PROCESSOR 11
MEMORY 12
COMMUNICATION UNIT 13

NETWORK

FIRST USER TERMINAL 20
COMMUNICATION UNIT 21
INPUT UNIT 22
OUTPUT UNIT 23
MEMORY 24
PROCESSOR 25

SECOND USER TERMINAL 30
COMMUNICATION UNIT 31
INPUT UNIT 32
OUTPUT UNIT 33
MEMORY 34
PROCESSOR 35

FIG. 3

| Reference Point-in-Time Information | ID NO. | Friend Name | Assessment of First Condition | | | Assessment of Second Condition | | | | Friend to Be Notified | Remarks |
|---|---|---|---|---|---|---|---|---|---|---|---|
| | | | Characteristic Point-in-Time information | Additional Description of Characteristic Point-in-time | Whether to Meet First Condition | History of gifting to User | Moment of Gifting to User | Additional Condition Set by User | Whether to Meet Second Condition | | |
| Aug 31, 2022 | 01 | Mike | Aug 31, 2022 | Birthday | O | O | Sep 6, 2021 | | O | O | - First Condition: Birthdate matches the reference point-in-time.<br>- Second Condition: Gift to the user within the past year. |
| | 02 | Steve | Aug 31, 2022 | Birthday | O | O | Nov 23, 2021 (User's birthday) | | O | O | - First Condition: Birthdate matches the reference point-in-time.<br>- Second Condition: Gift to the user within the past year. |
| | 03 | A | Aug 31, 2022 | Birthday | O | O | Sep 30, 2021 | Exception set by user | X | X | |
| | 04 | B | Aug 31, 2022 | Birthday | O | O | Jan 5, 2021 | | X | X | |
| | 05 | C | Aug 31, 2022 | Birthday | O | X | | | X | X | |
| | 06 | Tom | Aug 31, 2022 | Birthday | O | X | | Meeting criterion for interaction with user | O | O | - First Condition: Birthdate matches the reference point-in-time.<br>- Second Condition: Satisfaction of user interaction criteria. |
| | 07 | D | Sep 2, 2022 | Birthday | X | O | Nov 22, 2021 | | O | X | |
| | 08 | E | Dec 31, 2022 | Birthday | X | O | Oct 22, 2021 | | O | X | |
| | 09 | Dave | Aug 31, 2022 – Sep 10, 2022 | Aug 31, 2022(10 days before Chuseok) | O | O | Jan 25, 2022 (7 days before Lunar Near Year Holiday) | | O | O | - First Condition: Corresponding holiday gift history<br>- Second Condition: Corresponding holiday gift history |
| | 10 | Carrie | Aug 31, 2022 | User-specified. | O | X | | Set by user | O | O | - First Condition:: User-specified point-in-time matches reference point-in-time.<br>- Second Condition:: User-specified. |
| | 11 | F | May 8 of Every Year (Parents Day) | Based on relationship with user | X | X | X | Based on relationship with user | O | X | |

METHOD AND SERVER FOR PROVIDING NOTIFICATION MESSAGE TO USER TERMINAL

CROSS-REFERENCE TO RELATED APPLICATION

This application claims priority to and the benefit of Korean Patent Application No. 10-2022-0171603 filed on Dec. 9, 2022, the disclosure of which is incorporated herein by reference in its entirety.

BACKGROUND

Technical Field

The present disclosure relates to a method for providing a user terminal with a notification message about a friend account that meets predetermined conditions.

Description of Related Technology

Recent social media services and messenger services, based on extensive user networks, offer various features that can be utilized by their users. One of these prominent features is a gift-giving feature designed for the users to exchange gifts with each other.

SUMMARY

One aspect is to identify a friend for whom gift-sending is suggested based on pre-defined conditions in a user terminal and to provide a message suggesting gifting to the friend.

Another aspect is to provide a message that suggests sending a gift to a friend at an appropriate time based on the existing gift history information between a user account and a friend account.

Another aspect is a method in which a server provides a notification message to a user terminal, the method including: determining whether characteristic point-in-time information dependent on a friend account of a user account meets a first condition based on the reference point-in-time information and whether the friend account meets a second condition with respect to the user account; identifying the friend account as a friend to be notified based on whether the first condition and the second condition are met; and providing a message including information about the friend to be notified to the user terminal.

The characteristic point-in-time information may be birthday information of the friend account.

The characteristic point-in-time information may be time information entered so that the user account is dependent on the friend account.

The characteristic point information may be determined based on gift history information on any gift given by the friend accounts to the user account.

The characteristic point-in-time information may be determined based on relationship information between the user account and the friend account, and the relationship information may pertain to at least one of the following: name information given by the user account to the friend account, nature of a chat room where the user account and the friend account participate, and content of conversation between the user account and the friend account.

The first condition may be whether at least part of the characteristic point-in-time information is included in the reference point-in-time information.

The second condition may be determined based on gift history information on any gift given by the friend account to the user account.

The gift history information may include at least one of the following: a moment of gifting, a type of gift, price of the gift, content of a message dependent on the gift, and information entered by the user account regarding the gift.

Whether the second condition is met may be determined based on a history of the friend account performing a predetermined action to the user account within a predetermined period.

Whether the second condition is met may be determined based on relevance of the friend account's use of a service provided by the server to the user account.

The friend account may be specified by the user account as meeting the second condition.

The message may further include information about a reason the friend to be notified meets at least one of the first condition and the second condition.

The message may further include a chat room link to a chat room with the friend to be notified.

The message may include a gifting-related interface, and the method may further include, in response to receiving information corresponding to an interaction with the interface from the user terminal, providing the user terminal with a gift page where the friend to be notified is specified as a gift recipient.

The gift page may include at least one piece of history information of gifting from the friend to be notified to the user account.

The at least one piece of the history information of gifting may is a reason the friend to be notified meets at least one of the first condition and the second condition.

The gift page may include information about a recommended gift determined based on history information of gifting from the friend to be notified to the user account.

The message may be provided to the user terminal when at least one of a predetermined time condition and a predetermined message reception condition for the user terminal is met.

Another aspect is a server for providing a notification message to a user terminal, the server including: a memory storing instructions, and a processor configured to execute the instructions to: determine whether characteristic point-in-time information dependent on a friend account of the user account meets a first condition based on the reference point-in-time information and whether the friend account meets a second condition with respect to the user account; identify the friend account as a friend to be notified based on whether the first condition and the second condition are met; and provide a message comprising information on the friend to be notified and a gifting-related interface to the user terminal.

In the present disclosure, it is possible to identify a friend for whom gift-sending is suggested based on pre-defined conditions in a user terminal and to provide a message suggesting gifting to the friend.

Additionally, in the present disclosure, it is possible to provide a message that suggests sending a gift to a friend at an appropriate time based on the existing gift history information between a user account and a friend account.

BRIEF DESCRIPTION OF THE DRAWINGS

FIG. 1 is a diagram illustrating an example of a network environment of the present disclosure.

FIG. 3 is a table summarizing the results of a server of the present disclosure determining whether a friend account of a user account meet first and second conditions.

DETAILED DESCRIPTION

Figure 2:
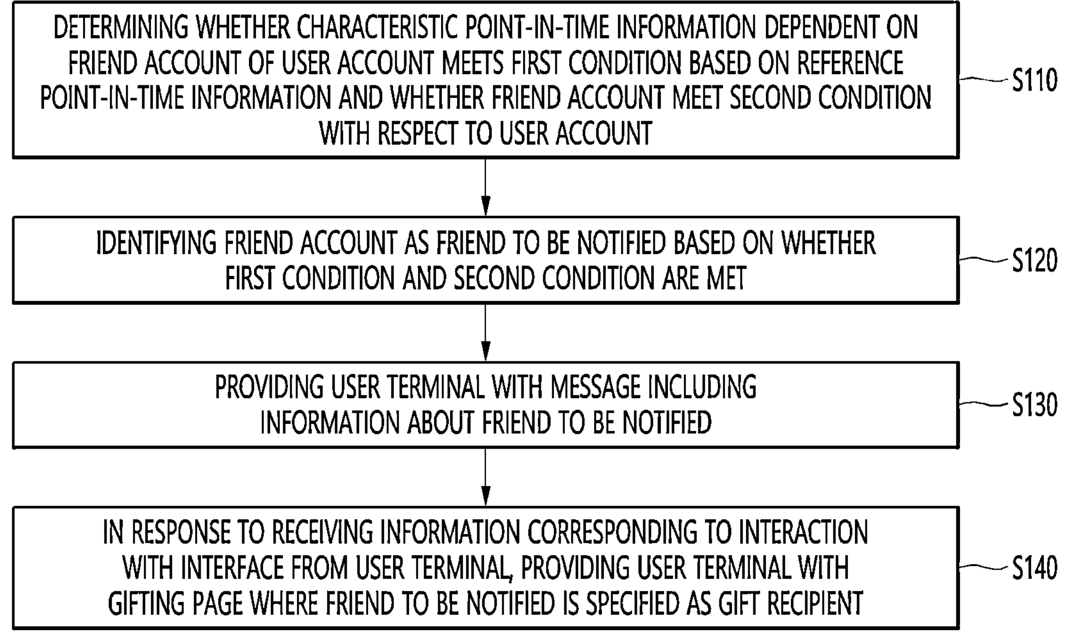
FIG. 2 is a flowchart for explaining a method for providing a notification message to a user terminal according to an embodiment of the present disclosure.

A gift-giving feature allows users to easily send gifts to their friends within the service in a straightforward manner. Additionally, this feature allows users to include messages along with their gifts, contributing to the increasing usage of this gift-giving functionality. Recently, further enhancements have been added to the gift-giving feature, including the option to create wishlists of items that users desire or offering gift recommendations tailored to factors such as the recipient's age, gender, and preferences.

With the widespread adoption of the gift-giving feature in social media and messenger services, there is a growing demand for services that suggest the timing for gift-giving or recommend suitable gifts based on the recipient's personal information or historical data.

Hereinafter, embodiments disclosed in the present specification will be described in detail with reference to the attached drawings. For the sake of brief description with reference to the drawings, the same or equivalent components may be provided with the same or similar reference numbers, and description thereof will not be repeated. In addition, in the following description of the embodiments, a detailed description of known functions and configurations incorporated herein will be omitted when it may impede the understanding of the embodiments.

While terms including ordinal numbers, such as "first" and "second," etc., may be used to describe various components, such components are not limited by the above terms. The above terms are used only to distinguish one component from another.

The singular forms are intended to include the plural forms as well, unless the context clearly indicates otherwise.

In this application, operations described herein may be performed irrespective of the listed order, except for a case where the operations must be performed in the listed order due to a special cause-effect relation of the operations.

It will be further understood that the terms "comprises," "comprising," "includes," "including," "have" and/or "having" when used herein, specify the presence of stated features, integers, steps, operations, elements, and/or components, but do not preclude the presence or addition of one or more other features, integers, steps, operations, elements, components, and/or groups thereof.

Hereinafter, the present disclosure will be described with reference to the attached drawings.

FIG. 1 is a diagram illustrating an example of a network environment according to an embodiment of the present disclosure.

The network environment according to an embodiment of the present disclosure shown in FIG. 1 may include a server 10, a first user terminal 20, and a second user terminal 30.

The server 10 is a device that provides a messenger service and a gift service to user terminals. The user terminal exemplified by the first and second user terminals 20 and 30 is a device that use the messenger service and gift service provided by the server 10.

In the present disclosure, in relation to the service provided by the server 10 the terms "user" and the "user account" corresponding to that user may be essentially used interchangeably. For example, when the server 10 transmits certain information to a user, it may be interpreted as transmitting the information to the user's user account or to the user's user terminal. In addition, the act of inputting information into the user account on server 10 may be interpreted as either the user manually entering information by operating a terminal device or as information being input through the corresponding user account. The messenger service is a platform provided by server 10, allowing multiple users to send or receive messages through a platform provided by the server 10. Here, a message may be understood to include all types of transmittable data, including text, photos, videos, voice files, emoticons, and link information.

The gift service is a service that allows multiple users to provide a gift to a specific person through the platform provided by the server 10. The gift service may be performed based on the above-described messenger service. When a first user sends a gift to a second user, the server 10 may receive a gift provision request from the first user terminal 20 to send a gift to a second user account. Then, the server 10 may send corresponding gift information to the second user terminal 30. Here, the gift includes exchange vouchers, content usage coupons, physical items delivered to the recipient, and is not limited to a specific form.

In the service provided by the server 10, a user account may establish a friendship relationship with another user account. The friendship relationship between users may be established one-way or two-way. The friendship relationship established one-way means that the first user is a friend of the second user, while the second user may not be a friend of the first user. However, the friendship relationship established two-way means that if the first user is a friend of the second user, the second user is also a friend of the first user.

Communication schemes for a network is not limited. The communication schemes may include not only a communication scheme to utilize a telecommunication network (for example, a mobile communication network, wired Internet, wireless Internet, and a broadcast network), but also a short-range radio communication scheme.

The server 10 may be implemented as a computer device or a plurality of computer devices that provide commands, codes, files, contents, services, and the like. The server 10 may be a server 10 capable of transmitting and receiving information through communication with a user terminal via a network.

The server 10 may include a processor 11, a memory 12, and a communication unit 13.

The processor 11 may control the overall operation of the memory 12 and the communication unit 13 to provide a messenger service to the user terminal.

The memory 12 serves as a storage medium and may store a number of application programs running on the server 10, and data and commands for operation of the server 10. In one embodiment, applications related to messenger services and gift services may be stored in the memory 12.

The memory 12 may be provided in the form of any of various hardware storage devices such as an ROM, an RAM, a flash drive, a hard drive, etc. or may be provided in the form of web storage.

The communication unit 13 may communicate with a user terminal in a wired or wireless manner through a network.

The server 10 of the present disclosure determines whether characteristic point-in-time information dependent on friend accounts associated with a user account meets a first condition based on reference point-in-time information and whether each of the friend accounts meets a second condition with respect to the user account. Subsequently, the server 10 identifies at least some of the friend accounts as friend to be notified based on whether the first and second conditions are met. The server 10 provides a message including information about a friend to be notified to the user terminal.

In addition, the message may include a gifting-related interface. When the server 10 receives information corresponding to an interaction with the interface provided from the user terminal, the server 10 may provide the user terminal with a gift page where a friend to be notified is specified as the gift recipient.

Here, the reference point-in-time information is information that serves as the basis for determining whether a friend account of the user account meets the first condition. In general, the reference point-in-time information may be based on a current point in time of determination. However, the reference point-in-time information may also be set as a period of time from the current point in time as a reference or to change based on various detailed settings.

Here, the characteristic point-in-time information is information that serves as the basis for determining whether a friend account meets the first condition. The characteristic point-in-time information is information that is stored in association with the friend account. For example, the characteristic point-in-time information may be birthday information of the friend account. In some cases, the characteristic point-in-time information may be specified by the user account or the friend account through a request to the server.

Here, the first condition may be determined based on the inclusion or overlap of the reference point-in-time information and the characteristic point-in-time information. For example, whether the first condition is met may be determined based on whether the characteristic point-in-time information is included in the reference point-in-time information. When the characteristic point-in-time information is period information rather than a single point in time, whether the first condition is met may be determined based on whether at least a partial period or the entire period of the characteristic point-in-time information are included in the reference point-in-time information.

Various examples of the reference point-in-time information, characteristic point-in-time information, and first condition will be described in more detail below with reference to operation S110 of FIG. 2 and FIG. 3.

Here, the second condition may be determined based on a relationship between the user account and the friend account. For example, whether the second condition is met may be determined based on whether the friend account has a history of gifting to the user account within the last year. Various examples of the second condition will be described in more detail below with reference to operation S110 of FIG. 2 and FIG. 3.

Here, the friend to be notified refers to the account of a friend who is the target for which the server intends to provide information to the user terminal. A friend to be notified may be identified based on whether the first condition and the second condition are met. This will be explained below with reference to FIG. 2.

Here, a gift recipient refers to a person who receives a gift. When specified as the gift recipient and upon receiving the gift, the gift recipient obtains ownership and disposal rights over the gift.

For convenience of explanation, it is assumed that the first user has a friendship relationship with the second user. In the present disclosure, the first user terminal 20 refers to a user terminal that receives and displays a message and a gift page for a friend to be notified from the server 10 as described above. Also, the second user terminal 30 refers to a terminal associated with the first user's friend account.

Hereinafter, it may be understood that the user terminal refers to the first user terminal 20 and the friend account terminal refers to the second user terminal.

The first user terminal 20 may include a communication unit 21, an input unit 22, an output unit 23, a memory 24, and a processor 25.

The communication unit 21 may communicate with the server 10 or other terminals in a wired or wireless manner.

The input unit 22 may receive various information through the user's manipulation and input actions. The input unit may include a touch screen module, a keyboard, a mouse, a button, a camera, a stylus, and a microphone.

The first user terminal 20 may receive a user's interaction through the input unit 22. The interaction indicates the user's operating the input unit 22 to input information reflecting the user's selection or intention into the first user terminal 20. For example, the interaction may include touching on a touchscreen, clicking with a mouse, typing on a keyboard, providing voice input through a microphone, capturing an image using a camera, recognizing movements through a motion sensor, and the like.

The output unit 23 may output various information. The output unit 23 may be a display device, a speaker, a vibration generator, a tactile generator, etc. In some cases, the output unit 23 may be a device (e.g., Bluetooth earphone) that is connected to the user terminal through wired or wireless communication (e.g., short-range radio communication such as Bluetooth) to receive and output a signal.

The memory 24 serves as a storage medium and may store a plurality of application programs running on a user terminal, and data and instructions for operating the first user terminal 20. This memory may be provided in the form of any of various hardware storage devices such as an ROM, an RAM, a flash drive, a hard drive, etc. or may be provided in the form of web storage. In one embodiment, an application associated with a messenger service and gift service (hereinafter referred to as "application") may be stored in the memory 24.

The processor 25 may execute an application by controlling the overall operation of the communication unit 21, the input unit 22, the output unit 23, and the memory 24.

The detailed configuration of the second user terminal 30 is substantially the same as that of the first user terminal 20. The second user terminal 30 may include a communication unit 31, an input unit 32, an output unit 33, a memory 34, and a processor 35. A detailed description of the configuration of the second user terminal 30 will be omitted in favor of the description provided for the first user terminal 20.

FIG. 2 is a flowchart illustrating a method in which the server 10 provides a notification message to a user terminal according to an embodiment of the present disclosure.

In operation S110, the server determines whether a friend account meets a first condition and a second condition.

Here, the friend account refers to a user account registered as a friend of the user account in a messenger service or gift service provided by the server 10.

The first condition may be whether characteristic point-in-time information dependent on the friend account meets a predetermined condition based on reference point-in-time information.

The reference point-in-time information is information that serves as the basis of determining whether the friend account of the user account meets the first condition. The reference point-in-time information may be determined based on a current point in time for determination. For example, if the current point in time is Aug. 31, 2022, the reference point-in-time information may be set as Aug. 31, 2022.

In some cases, the reference point-in-time information may be information on a specified period determined based on the current point in time. For example, the reference point-in-time information may be set as a period of 3 days from the current point in time. In this case, if the current point in time is Aug. 31, 2022, the reference point-in-time information may be a period from Aug. 31, 2022 to Sep. 2, 2022.

In some cases, the reference point-in-time information may be a point in time that occurs a predetermined period before or after the current point in time. For example, the reference point-in-time information may be set as a point in time 10 days after the current point in time point. In this case, if the current point in time is Aug. 31, 2022, the reference point-in-time information may be Sep. 10, 2022.

The characteristic point-in-time information is information that serves as the basis for determining whether the friend account meets the first condition. The characteristic point-in-time information is information that is stored in association with the friend account.

The characteristic point-in-time information may be identified by the server 10 based on personal information, etc., dependent on the friend account. For example, if the friend's birthday information is stored in the friend account, the birthday information may be identified as the characteristic point-in-time information.

Additionally, in some cases, the user account or the friend account may directly specify characteristic point-in-time information dependent on the friend account on the server. For example, if the user account wishes to give a gift to a specific friend account on Aug. 31, 2022, and receive corresponding time-in-point information, the user account may input characteristic point-in-time information of Aug. 31, 2022, for the specific friend account to the server. In addition, the friend account may specify and input his or her wedding anniversary, etc. as the characteristic point-in-time information.

Additionally, in some cases, the characteristic point-in-time information of the friend account may be determined based on relationship information between the user account and the friend account. Specifically, the relationship information may be at least one of the following: name information assigned by the user account to the friend account, the nature of a chat room where the user account and friend account both participate, and at least one conversation between the user account and the friend account. Here, the relationship information is not limited to the examples described above.

For example, there may be a case where the user account saves a specific friend account as "Mom" in the user terminal. In this case, based on the saved name for that specific friend account, such as "Mom," the characteristic point-in-time information for the specific friend account may be determined as Parents Day (May 8 of every year).

The characteristic point-in-time information may be a unit point in time described as a specific date or may be a period defined by a start point and an end point. For example, if the user account wishes to specify characteristic point-in-time information for a specific friend account regarding the Chuscok (Korean Thanksgiving) of 2022 (Sep. 10, 2022), Chuscok itself (Sep. 10, 2022) may be set as characteristic point-in-time information. However, it is also possible to specify a period from 10 days before Chuscok to Chuscok (Aug. 31, 2022, to Sep. 10, 2022) as characteristic point-in-time information.

The first condition may be determined based on the inclusion or overlap of the reference point-in-time information and the characteristic point-in-time information. For example, whether the first condition is met may be determined based on whether the characteristic point-in-time information is included in the reference point-in-time information. In a case where both the reference point-in-time information and the characteristic point-in-time information are set as Aug. 31, 2022, the two points in time coincide, so it may be determined that he first condition is met.

If characteristic point-in-time information is information on a point in time that recurs every year (e.g., a friend account's birthday), the characteristic point-in-time information may be February 29 every year. In this case, in years when February 29 does not exist, the characteristic point-in-time information may be adjusted to February 28.

Furthermore, if the characteristic point-in-time information pertains to a period rather than a single point in time, whether the first condition is met may be determined based on whether at least a partial period of the characteristic point-in-time information or the entire period of the characteristic point-in-time information is included in the reference point-in-time information. For example, if the reference point-in-time information is a period from Aug. 31, 2022, to Sep. 2, 2022, and the characteristic point-in-time information is a period from 10 days before Chuscok to Chuscok (Aug. 31, 2022, to Sep. 10, 2022), part of the characteristic point-in-time information falls within the reference point-in-time information, and thus, it may be determined that the first condition is met.

Various examples regarding the reference point-in-time information, characteristic point-in-time information, and first conditions will be described in more detail below with reference to FIG. 3.

Whether the second condition is met may be determined based on a relationship between the user account and the friend account.

For example, whether the second condition is met may be determined based on gift history information on a gift from the friend account to the user account. Specifically, the gift history information on may include at least one of the following: a moment of gifting, a type of the gift, the price of the gift, the content of a message dependent on the gift, or information entered by the user account regarding the gift.

For example, when it comes to the moment of gifting, whether the second condition is met may be determined based on whether the friend account gave a gift to the user account within the last year. In addition, whether the second condition is met may be determined based on whether the friend account gave a gift to the user account at a predetermined specific time (e.g., the user's birthday or Christmas) or within a specific period (e.g., within 10 days before or after the user's birthday or a period from 10 days before the day of Lunar New Year to the day of Lunar New Year).

For example, when it comes to the type or price of the gift, whether the second condition is met may be determined based on whether the type of gift that the friend account gave to the user account matches a type pre-specified by the user account (e.g., a food-related gift or a clothing-related gift). In addition, whether the second condition is met may be determined based on whether the price of the gift that the friend account gave to the user account matches a price condition pre-specified by the user account (e.g., 50,000 KRW or more).

For example, when it comes to the content of a message dependent on the gift, the friend account may provide a message when giving a gift to the user account. The message may be, for example, a gift card or greeting card. Whether the second condition is met may be determined based on whether the content of the message meets a predetermined condition. For example, the user account may set a wedding congratulatory gift from a friend as meeting the second condition. In this case, if the message provided by the friend account when giving a gift to the user account includes words like “marriage,” “wedding,” “honeymoon,” and so on, a corresponding gift history may be set as meeting the second condition.

When it comes to information entered by the user account regarding the gift, the user account may add and store information such as “Reciprocate Later” for the gift received from the friend account. Whether the second condition is met may be determined based on whether the information entered by the user account for the gift meets a predetermined condition. For example, the user account may store information for a specific gift received from a particular friend, such as “Reciprocate on the wedding day on Dec. 3, 2022.” In this case, if the reference point-in-time information used to determine whether the second condition is met falls on Dec. 3, 2022, a gift history on a gift received from the corresponding friend may be set as meeting the second condition.

As another example, whether the second condition is met may be determined based on a relevance of the friend account’s use of the service provided by the server to the user account. Specifically, whether the second condition is met may be determined based on how much interaction the user account and the friend account have had in the service provided by the server.

Specifically, whether the second condition is met may be determined based on the following: how many likes the friend account has left on the user’s profile, personal page, speech bubbles, comments, or replies; how much conversation, video calls, voice calls, or interactions the friend account has had with the user account; how many chat rooms the friend account has participated in with the user account; and how many events or tasks the friend account has created or performed together with the user account.

Interactions between the friend account and the user account in the service provided by such a server may be calculated as a specific numeric value, and if the calculated numeric value meets a predetermined criterion, it may be determined that the friend account meets the second condition.

In some cases, the user may select desired types of interactions with the friend account in a variety of services. In this case, the server may calculate a numeric value of a selected interaction based on the selected type of interaction. This numeric value may be used by the server to determine whether the friend account meets the second condition.

As another example, the friend account may be specified by the user as meeting the second condition. The user may directly specify a specific friend account as meeting the second condition, regardless of the above-described gift history information or interaction information of the friend account. Specifically, the user may select a specific friend account from a friend list thereof and set the specific friend account as a “target for gift recommendation on Aug. 31, 2022,” thereby directly setting the specific friend account as meeting the second condition.

However, even if the specific friend account is determined to meet the second condition based on the above-described gift history information or interaction information of the friend account, the friend account may be set by the user not as meeting the second condition. For example, the second condition may be whether the friend account has gifted the user account within the last year, and a history of gifting from the specific friend account within the last year may be associated with marketing rewards or the like. In this case, the user account may see no reason to send a gift to the specific friend account in the future. As a result, the user account may set the specific friend account not as meeting the second condition.

So far, various examples of the second condition have been described. However, the second condition is not limited to the above examples, and may be changed in various ways based on an action of the friend account on the user terminal, the content of the action, and a point in time of the action.

In operation S110, when the server determines whether the friend account meets the first condition and the second condition, the order of determination for the first condition and the second condition may not be limited to a specific order.

For example, the server may first determine whether the first condition is met for all friend accounts of the user account, and then access the second condition only for friend accounts that meet the first condition. Conversely, the server may first determine whether the second condition is met for all friend accounts of the user account, and then assess the first condition only for friend accounts that meet the second condition. Additionally, in some cases, the server may determine whether both the first condition and the second condition are met for each friend account of the user account.

In operation S120, the server identifies at least some of the friend accounts as friends to be notified based on whether the first condition and the second condition are met.

A friend accounts as a friend to be notified may be identified when the corresponding friend account meets at least one of the first condition and the second condition. That is, depending on settings, the friend account may be identified as a friend to be notified only when both the first and second conditions are met, or only when either of the first and second conditions is met.

In operation S130, the server provides a message about a friend to be notified to the user terminal.

The message may be provided through a chat room in the form of a message sent from a chatbot operated by the server or from a notification account operated by the service. The chat room in which the message is displayed may be a chat room containing a chatbot, My Chat Room, or a notification-only chat room. The chatbot refers to a chat robot program capable of communicating in everyday language through the messenger service. The notification account operated by the service may be displayed as a virtual speaker such as a character.

The server may provide a message to the user terminal at a predetermined time. Specifically, a specific time for providing a message may be set. For example, it may be set to provide a message to the user every day at 9:00 AM.

In addition, the server may provide a message to the user terminal when a predetermined condition is met. The predetermined condition may be a time condition. For example, the message may be provided every morning at 9 AM.

Additionally, the predetermined condition may be a message reception condition for the user terminal. For example, the message reception condition may be the first execution of a messenger service application by the user at a corresponding point in time. Specifically, in combination with a time condition, this condition may enable message delivery at a time when the user first executes the messenger service application after 6 AM every morning.

In addition, the message reception condition may involve determining the user's awakening using sensors like an acceleration sensor in the user terminal. Again, in combination with a time condition, this condition may enable message delivery at a time when the user is determined to have woken up between 7:00 AM and 11:00 PM.

In some cases, the user account may apply various detailed settings for message delivery. For example, the user account may set blocking message delivery, or may set a time and condition of message delivery.

A message provided may include at least one of the following: information about a friend to be notified, a gifting-related interface, and a chat room link to a chat room with the friend to be notified.

The information about the friend to be notified may include personal information (profile, name, status message, etc.) of the friend to be notified. In addition, the information about the friend to be notified may include information about why the friend account is identified as the friend to be notified. Specifically, the information about the reason the friend account is identified as the friend to be notified may be the reason that the first and second conditions are met in operation S110.

For example, if Friend A's account meets the first condition because the birthday of Friend A's account falls on today' which is reference point-in-time information, a message may include information such as "Today is Friend A's birthday."

In addition, if Friend A's account meets the second condition because Friend A's account has a history of gifting on your birthday last year, a message may include information such as "Your dear friend A, who celebrated your birthday last year."

The gifting-related interface may be displayed as a button-type interface included in the message. When the user applies an interaction with the gifting-related interface, the user may be directed to a gift page where the friend to be notified is specified as a gift recipient.

The chat room link to a chat room with the friend to be notified may be displayed as a button-type interface included in the message. When the user applies an interaction with an interface related to the chat room link, the user may be directed to a chat room with the friend to be notified.

Here, the chat room may be a one-on-one chat room between the friend to be notified and the user. If a one-on-one chat room has already been created between the friend to be notified and the user, the user may be directed to the existing one-to-one chat room. However, if there is no existing one-on-one chat room between the friend to be notified and the user, a new chat room may be created and the user may be directed to the new chat room.

A chat room may be a group chat room in which two or more users can participate, rather than a one-on-one chat room. Such a chat room may be related to a specific theme related to the reason that friend account is identified as a friend to be notified. For example, if the first condition is met because there is a marriage event at a point in time when the friend account meets the reference point-in-time information, the chat room connected through the interface related to the chat room link may be a group chat room with the theme of celebrating the marriage of the friend account.

Additionally, in some cases, when the user terminal enters the chat room through the interface related to the chat room link in operation S130, the server may provide a recommended message, etc. related to the reason the friend account is identified as a friend to be notified. For example, in the above example, when the user's account enters the group chat room with the theme of celebrating the marriage of the friend account, the server may provide a recommended message phrase, a recommended emoticon related to celebrating the marriage, or other recommended content to be delivered through the chat room.

In operation S140, the server provides a gift page to the user terminal.

Specifically, operation S140 may be performed when the server receives information corresponding to an interaction with the interface from the user terminal.

The gift page may be a page where the friend to be notified is specified as a gift recipient. Therefore, when the user account places an order for a gift through the gift page, the gift may be delivered to the friend to be notified without the need for additional separate input of a gift recipient.

The gift page may include gift history information related to gifting from the friend to be notified to the user account. In particular, when the friend to be notified has a history of gifting to the user account multiple times, the gift history information related to the reason for identifying the friend's account as the friend to be notified may be selected and included.

For example, let's assume that Friend A's account has provided the user account with three gifts over the last year, but is identified as a friend to be notified due to a gift history on the user account's birthday of last year. In this case, on the gift page where Friend A's account is specified as a gift recipient, a history of gifts provided by Friend A's account on the user's birthday last year may be selected and shown.

The gift page may include information about a recommended gift determined based on history information on any gift given to the user account by a friend to be notified. In particular, when the friend to be notified has a history of gifting to the user account multiple times, a recommended gift may be determined based on the gift history information related to the reason for identifying the friend's account as the friend to be notified.

For example, let's assume that Friend A's account has provided the user account with three gifts over the last year and is identified as a friend to be notified due to a gift history of "coffee" provided on the user's birthday last year. In this case, on the gift page where Friend A's account is specified as a gift recipient, "coffee" may be recommended as a gift for the birthday of Friend A's account based on the gift history of "coffee" provided by Friend A's account on the user's birthday last year.

This recommended gift may be determined based on the price of a gift the friend to be notified has provided, reference point in time or characteristic point-in-time information, and a relationship between the user account and the friend to be notified.

For example, if the price of a gift provided by a friend to be notified is 30,000 KRW, a recommended gift may be determined within a predefined acceptable range, such as +/−20%, based on the 30,000 KRW. In addition, if the characteristic point-in-time information dependent on the friend to be notified is Valentine's Day, a gift such as chocolate may be determined as a recommended gift. Furthermore, if the friend to be notified is saved as "grandfather" in the user terminal, a gift matching the characteristic of "grandfather" (for example, a *ginseng* gift set, traditional snacks, etc.) may be determined as a recommended gift.

FIG. 3 is a table summarizing the results of a server of the present disclosure determining whether a friend account of a user account meet first and second conditions.

Referring to FIG. 3, the server determines whether each of eleven friend accounts of the user account meets both the first and second conditions.

First, how the server 10 determines whether each of the Friend Identification (ID) Nos. 01 to 11 meets the first condition will be described.

The reference point-in-time information may be the date of Aug. 31, 2022, at which the determination is carried out according to operation S110. Whether the first condition is met may be determined based on whether the reference point-in-time information matches characteristic point-in-time information of a corresponding friend account.

In the case of Friend ID Nos. 01 to 08, birthday information of the friend accounts is reflected as characteristic point-in-time information. For Friend ID Nos. 01 to 06, the characteristic point-in-time information reflecting the birthday information matches the reference point-in-time information, so it is determined that the first condition is met. On the other hand, for Friend ID Nos. 07 to 08, the characteristic point-in-time information reflecting the birthday information does not match the reference point-in-time information, so it is determined that the first condition is not met.

However, in some cases, the reference point may be period information rather than specific point-in-time information. For example, unlike what is shown in the drawing, the reference point-in-time information may be set as a period of 3 days starting from the point in time when a determination is performed according to operation S110. In this case, the reference point-in-time information may be set as a period from Aug. 31, 2022 to Sep. 2, 2022. Based on this reference point-in-time information, in the case of Friend ID No. 07, the first condition may be determined to be met because characteristic point-in-time information (Sep. 2, 2022) is included in reference point-in-time information.

Friend ID No. 09 has a history of gifting to the user account on Jan. 25, 2022, which falls within the Lunar New Year gift period of 2022. Based on this, the Chuscok gift period (10 days before Chuscok to Chuscok, i.e., Aug. 31, 2022, to Sep. 10, 2022) is specified as characteristic point-in-time information. In addition, for Friend ID No. 10, the user has directly specified Aug. 31, 2022 as characteristic point-in-time information. In the case of Friend ID Nos. 09 and 10, the characteristic point-in-time information matches the reference point-in-time information, so it is determined that the first condition is met.

In addition, in the case of Friend ID No. 11, characteristic point-in-time information is specified as May 8 of every year based on a relationship with the user account (for example, if friend F is saved as "Mom" in the user terminal). In the case of Friend ID No. 11, since the characteristic point-in-time information does not match the reference point-in-time information, it is determined that the first condition is not met.

Hereinafter, it will be explained how the server 10 determines whether the second condition is met for Friend ID Nos. 01 to 11.

First, in the table of FIG. 3, whether the second condition is met is determined based on whether there is a history of the friend account gifting to the user account within the last year according to the reference point-in-time information. In addition, it is assumed that there is additional user-specified condition for the second condition.

For each of Friend ID Nos. 01 to 04, 07, and 08, there is a history of previously gifting to the user account, and a specific moment of gifting is determined. Each of Friend ID Nos. 01, 02, 07, and 08 is determined to meet the second condition because the moment of gifting meets a period condition (Aug. 31, 2021-Aug. 30, 2022). However, in the case of Friend ID No. 03, even though the moment of gifting meets the period condition (Aug. 31, 2021-Aug. 30, 2022), it is eventually determined that the second condition is not met because the user has set an exception for Friend ID No. 03. In the case of Friend ID No. 04, the moment of gifting does not meet the period condition (Aug. 31, 2021-Aug. 30, 2022), it is determined that the second condition is not met.

However, in some cases, whether the second condition is met may be determined based on whether a friend account has a history of gifting to the user account within a specific period based on the user's last birthday (as in FIG. 3, within 10 days before and after the user's birthday on Nov. 23, 2021). In this case, as shown in FIG. 3, among Friend ID Nos. 01 to 04 and 07, 08, Friend ID Nos. 02 and 07 are still determined to meet the second condition, but Friend ID Nos. 01, 03, 04, and 08 are determined not to meet the second condition.

In the case of Friend ID No. 05, it is determined that the second condition is not met because there is no history of gifting to the user account.

In the case of Friend ID No. 06, even though there is no history of gifting to the user account, it is determined that the second condition is met because the corresponding friend is considered meeting a criterion of interaction with the user.

For Friend ID No. 09, it may be understood that the second condition is met based there is a history of gifting to the user account on Jan. 25, 2022, which falls within the Lunar New Year gift period specified for 2022. For instance, even if the period condition for the second condition, as in the example mentioned, is altered to a specific period based on the birthday (within 10 days before and after the birthday on Nov. 23, 2021), it may be determined that Friend ID No. 09 still meets the second condition.

In the case of Friend ID No. 10, it may be determined that the second condition is met because there is no previous history of gifting to the user account, but the user has directly specified characteristic point-in-time information.

In the case of Friend ID No. 11, although there is no history of gifting to the user account, it may be determined the second condition is met based on another condition that is specified by the user based on a relationship with the user account.

Based on whether the multiple friend accounts described meet both the first and second conditions, the server may identify at least some of the multiple friend accounts as friends to be notified. Referring to FIG. 3, it can be seen that Friend ID Nos. 01, 02, 06, 09, and 10, meeting both the first and second conditions, are identified as friend to be notified.

FIGS. 4 to 9 are examples of screens displayed on a user terminal during a process of implementing a method for providing a notification message of the present disclosure.

Figure 4:
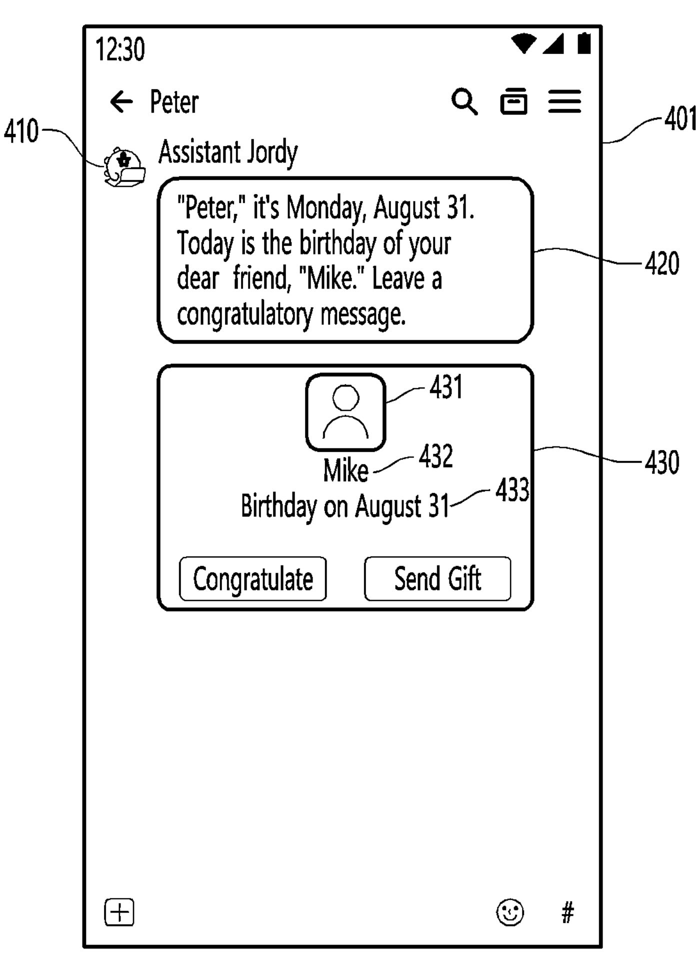
FIGS. 4 to 9 are examples of screens displayed on a user terminal during a process of implementing a method for providing a notification message of the present disclosure.

FIG. 4 is an example of a screen where a message is displayed on a user terminal according to a result of performing operation S130 described above.

FIG. 4 is an example of a screen in which Friend ID No. 01 (Friend Name: Mike) of FIG. 3 is identified as a friend to be notified, and a message for Friend ID No. 01 is provided.

Referring to FIG. 4, the messages may be displayed in the form of messages 420 and 430 provided through a chat room 401. Here, the message may include a first message 420 uttered by a speaker 410, and a second message 430 which includes information about a friend to be notified 431, 432, 433, a chat room link interface 434, and a gifting-related interface 435.

Specifically, the information about the friend to be notified may include a profile photo 431 of the friend, name 432 of the friend, and a reason 433 that the friend account is selected as the friend to be notified.

Figure 5:
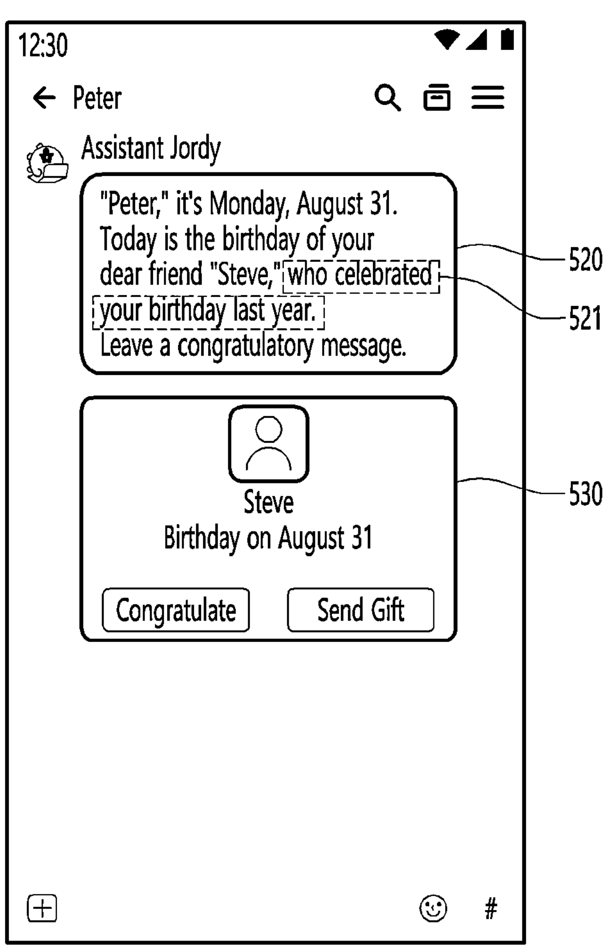

FIG. 5 is an example of a screen where a message is displayed on a user terminal according to a result of performing operation S130 described above.

FIG. 5 is an example of a screen in which Friend ID No. 02 (Friend Name: Steve) of FIG. 3 is identified as a friend to be notified, and a message for Friend ID No. 02 is provided.

With reference to FIG. 5, the description will focus on differences from FIG. 4.

Similarly to FIG. 4, a message may include a first message 520 and a second message 530. In addition, the first message 520 may display information about a reason that a friend to be notified meets a second condition.

As described above with reference to FIG. 3, if the second condition is met because the friend to be notified (Friend ID No. 02 in FIG. 3) has a history of giving the user from a corresponding friend account during a specific period based on the user's birthday of last year, the reason 521 why the second condition is met may be shown in the first message 520 of FIG. 5.

Figure 6:
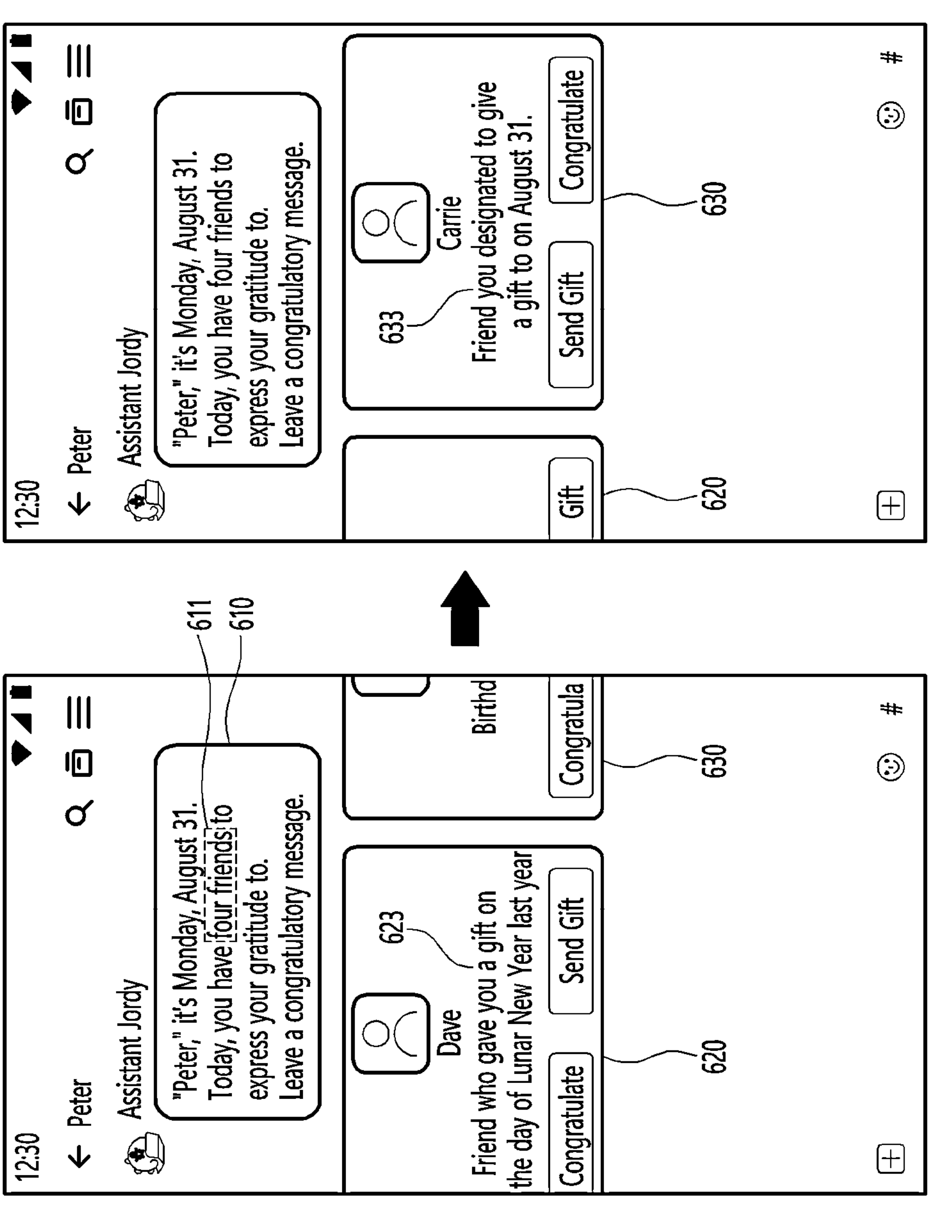

FIG. 6 is an example of a screen where a message is displayed on a user terminal according to a result of performing operation S130 described above.

FIG. 6 is an example of a screen where multiple friends from FIG. 3, namely, Friend ID No. 01 (Friend Name: Mike), Friend ID No. 02 (Friend Name: Steve), Friend ID No. 09 (Friend Name: Dave), and Friend ID No. 10 (Friend Name: Carrie), have been identified as friends to be notified, and messages are provided for the multiple friends to be notified.

With reference to FIG. 6, the description will focus on differences from FIG. 4.

Unlike the first message 420, which is the speech message of FIG. 4, a speech message 610 may include information 611 about the number of friends to be notified.

As shown in FIG. 6, a second message may be shown corresponding to each of the multiple friends to be notified. FIG. 6 shows second messages 620 and 630 corresponding to two friends to be notified, but if the user inputs a screen-sliding interaction, second messages corresponding to the other two friends to be notified may be shown.

As shown in FIG. 6, a plurality of second messages may be shown in a carousel structure that changes with horizontal slide interactions. However, a method for displaying the plurality of second messages is not limited to this.

Looking at the second messages 620 and 630 shown in FIG. 6, information about the each of the friends to be notified meets the second condition may be shown.

Figure 7:
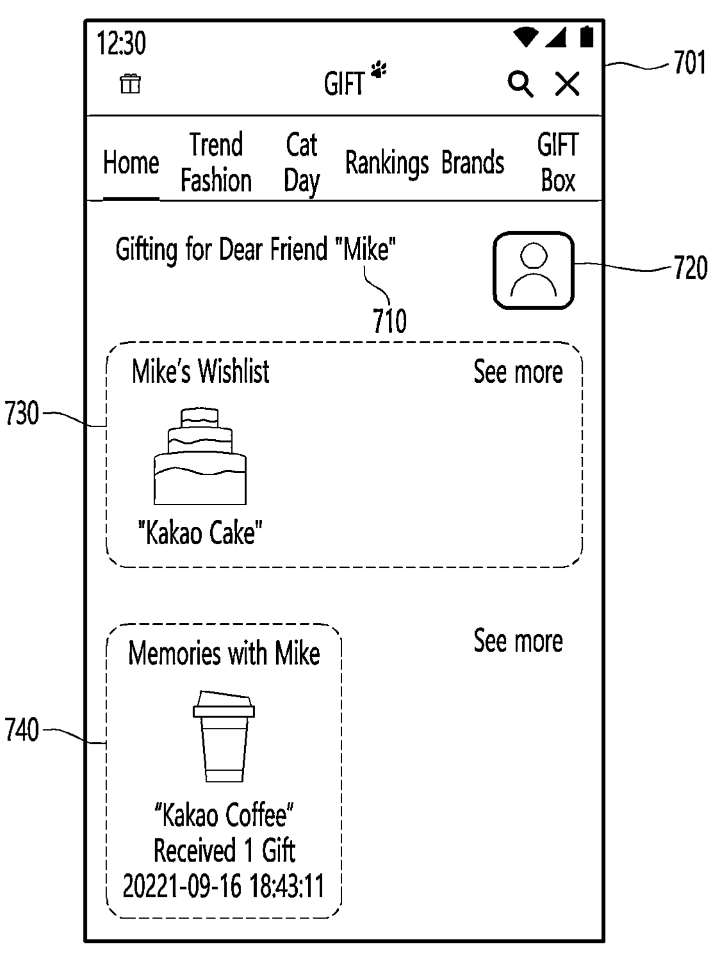

FIG. 7 is an example of a screen where a message is displayed on a user terminal according to a result of performing operation S140 described above.

FIG. 7 is an example of a screen where the server 10 provides a gift page for Friend ID No. 01 (Friend Name: Mike) in response to an interaction 435 with the gifting-related interface of FIG. 4.

Referring to FIG. 7, a gift page 701 may be displayed in which Friend ID No. 01 (Friend Name: Mike) is specified as the gift recipient. The gift page 701 may include the friend account's name 710, profile 720, a Wishlist 730, and details 740 of exchanged gifts between the user account and the friend account.

Figure 8:
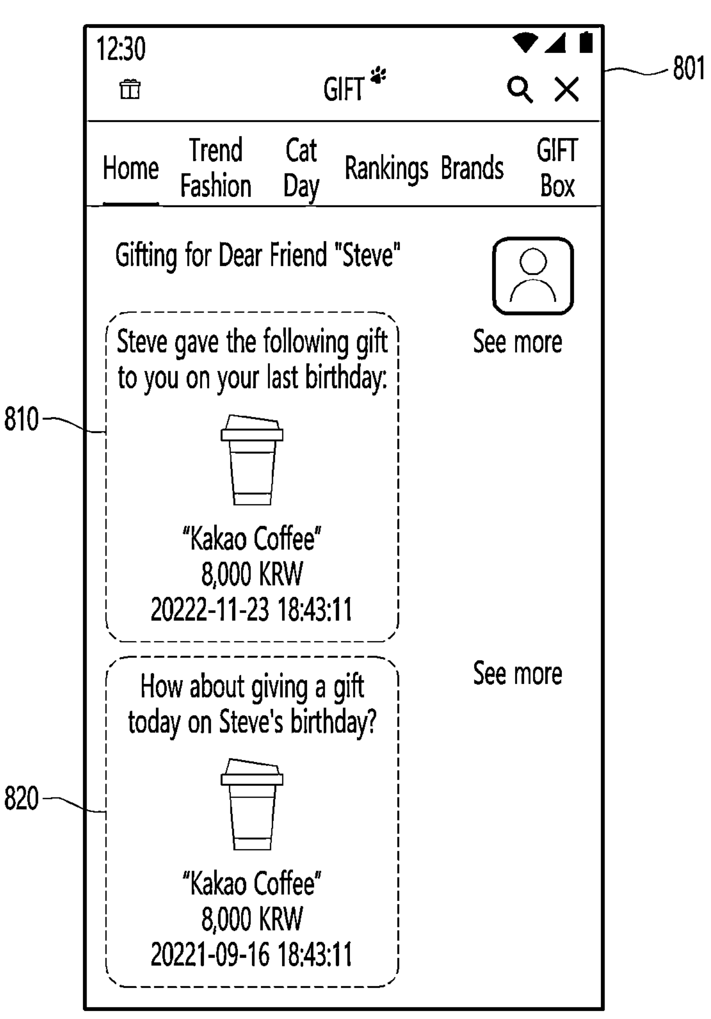

FIG. 8 is an example of a screen where a message is displayed on a user terminal according to a result of performing operation S140 described above.

FIG. 8 is an example of a screen where a gift page for Friend ID No. 02 (Friend Name: Steve) is provided in response to an interaction with the gift-related interface of FIG. 5.

With reference to FIG. 8, the explanation will focus on differences from FIG. 7.

Referring to FIG. 8, a gift page 801 may be displayed in which Friend ID No. 02 (Friend Name: Steve) is specified as the gift recipient. In addition, the gift page 801 may include details 810 of exchanged gifts between the user account and a corresponding friend account, and recommended gift information 820 determined based on the details of exchanged gifts between the user account and the friend account.

Figure 9:
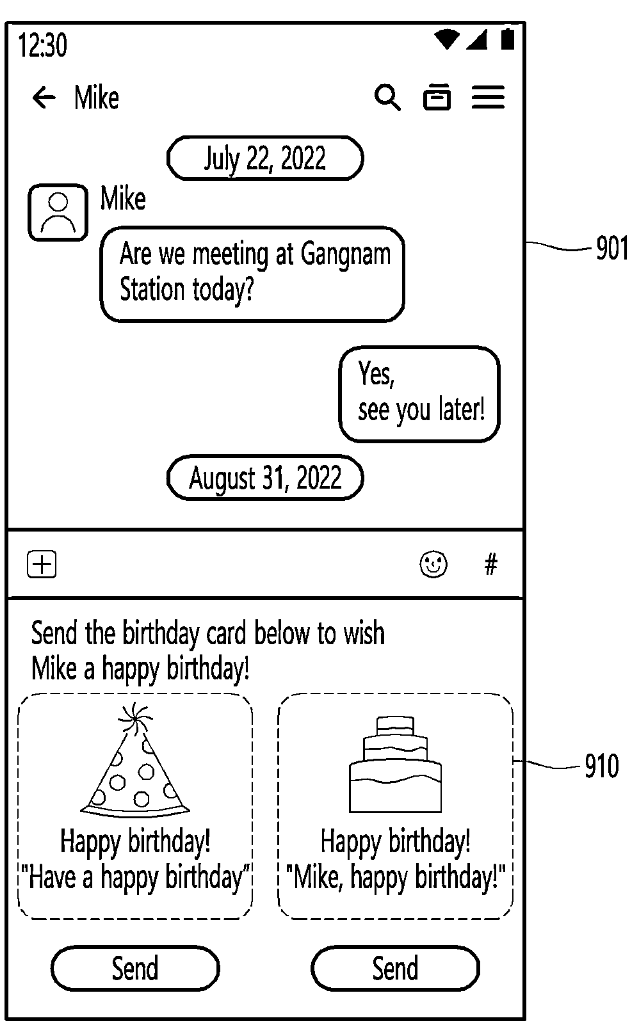

FIG. 9 is an example of a screen where a chat room is displayed on a user terminal in response to an interaction with a chat room link on the user terminal. Specifically, FIG. 9 is an example of a screen displayed when an interaction with the interface 434 related to the chat room link in FIG. 4 is initiated on the user's device.

Referring to FIG. 9, a chat room is displayed with the friend to be notified as the conversation partner. As shown in FIG. 9, if a chat room has already been created between the user and the friend to be notified, the user may enter the existing chat room. If there is no existing chat room between the user and the friend to be notified, a new chat room may be created and the user may be directed to the chat room.

The server may suggest sending a recommendation input message related to the reasons the friend account is identified as a friend to be notified. Referring to FIG. 9, one of the reasons the friend account is identified as the friend to be notified is due to the friend account's birthday. In such cases, suggesting the sending of a message card 910 to easily send a message related to celebrating the friend account's birthday may be considered.

The technical features disclosed in each embodiment of the present disclosure are not limited to a corresponding embodiment, and unless incompatible with each other, the technical features disclosed in each embodiment may be applied in combination to other embodiments.

Therefore, although each embodiment is described mainly about an individual technical feature, the technical features of the embodiments of the present disclosure may be applied in combination, unless incompatible with each other.

The present disclosure is not limited to the above-described embodiments and the accompanying drawings, and various modifications and changes may be made in view of a person skilled in the art to which the present disclosure pertains. Therefore, the scope of the present disclosure should be determined by the scope of the appended claims, and equivalents thereof.

What is claimed is:

1. A method in which a server provides a notification message to a user terminal, the method comprising:

determining, based on reference point-in-time information, whether characteristic point-in-time information dependent on a friend account of a user account satisfies a first condition;

determining whether the friend account meets a second condition with respect to the user account, the second condition being determined based on object history information corresponding to an object previously provided by the friend account to the user account, the object history information comprising at least one of: a time at which the object was provided, a type of the object, a price of the object, or content of a message associated with the object;

identifying the friend account as a friend to be notified only when both the first condition and the second condition are met; and providing, to the user terminal, a notification message including information about the friend to be notified.

2. The method of claim 1, wherein the characteristic point-in-time information comprises birthday information of the friend account.

3. The method of claim 1, wherein the characteristic point-in-time information comprises time information entered so that the user account is dependent on the friend account.

4. The method of claim 1, wherein the characteristic point information is determined based on object history information on a gift given by the friend account to the user account.

5. The method of claim 1, wherein:

the characteristic point-in-time information is determined based on relationship information between the user account and the friend account, and the relationship information pertains to at least one of the following: name information given by the user account to the friend account, nature of a chat room where the user account and the friend account participate, or content of conversation between the user account and the friend account.

6. The method of claim 1, wherein the first condition is whether at least part of the characteristic point-in-time information is included in the reference point-in-time information.

7. The method of claim 1, wherein the object history information further comprises information entered by the user account regarding the object.

8. The method of claim 1, wherein the message further comprises information identifying a reason that the friend account meets both the first condition and the second condition.

9. The method of claim 1, wherein the notification message further comprises a chat room link to a chat room with the friend to be notified.

10. The method of claim 1, wherein:

the notification message comprises a gifting-related interface, and the method further comprises, in response to receiving information corresponding to an interaction with the interface from the user terminal, providing the user terminal with a gift page where the friend to be notified is specified as a gift recipient.

11. The method of claim 10, wherein the gift page comprises at least one piece of history information of gifting from the friend to be notified to the user account.

12. The method of claim 10, wherein the gift page comprises information about a recommended gift determined based on history information of gifting from the friend to be notified to the user account.

13. The method of claim 1, wherein the notification message is provided to the user terminal in response to at least one of a predetermined time condition and a predetermined message reception condition for the user terminal being met.

14. A non-transitory computer-readable recording medium including instructions which, when executed by one or more processors, cause the one or more processors to perform the method of claim 1.

15. The method of claim 1, wherein the second condition is met only when the object history information indicates that the friend account provided an object to the user account within a predetermined period relative to the reference point-in-time information.

16. The method of claim 1, wherein the notification message or a gift page provided in response to the notification message includes only object history information corresponding to objects provided by the friend account to the user account within a predetermined period relative to the reference point-in-time information.

17. The method of claim 1, wherein object history information corresponding to objects provided outside a predetermined period relative to the reference point-in-time information is excluded from consideration when determining the second condition.

18. A server for providing a notification message to a user terminal, the server comprising:

a memory storing instructions; and a processor configured to execute the instructions to:

determine, based on reference point-in-time information, whether characteristic point-in-time information dependent on a friend account of a user account satisfies a first condition;

determine whether the friend account meets a second condition with respect to the user account, the second condition being determined based on object history information corresponding to an object previously provided by the friend account to the user account, the object history information comprising at least one of: a time at which the object was provided, a type of the object, a price of the object, or content of a message associated with the object;

identify the friend account as a friend to be notified only when both the first condition and the second condition are met; and provide, to the user terminal, a notification message including information about the friend to be notified.

* * * * *